United States Patent [19]

Bumgardener

[11] 4,079,987
[45] Mar. 21, 1978

[54] CONTAINER SYSTEM FOR ENTERTAINMENT AND COMMUNICATIONS EQUIPMENT

[76] Inventor: Daniel T. Bumgardener, 4740 Appian Way, El Sobrante, Calif. 94803

[21] Appl. No.: 711,824

[22] Filed: Aug. 5, 1976

[51] Int. Cl.² .............................................. B60R 5/02
[52] U.S. Cl. ............................... 296/37.7; 224/42.1 C; 296/37.8
[58] Field of Search ................. 296/28 C, 39 A, 37.1, 296/37.7, 37.8; 312/7 TV, 8, 9, 10; 224/42.1 C, 42.42 R, 42.46 R

[56] References Cited

U.S. PATENT DOCUMENTS

| | | | |
|---|---|---|---|
| 2,023,719 | 12/1935 | Arrison | 296/37.7 |
| 3,261,521 | 7/1966 | Meccico | 224/42.46 R |
| 3,773,378 | 11/1973 | Lewis | 296/37.7 |
| 3,847,316 | 11/1974 | McInnes | 224/42.1 C |
| 3,856,192 | 12/1974 | Nelson | 296/37.7 |

*Primary Examiner*—Joseph F. Peters, Jr.
*Assistant Examiner*—John A. Carroll
*Attorney, Agent, or Firm*—Daniel C. Block

[57] ABSTRACT

This invention relates to a container system for more secure mounting of communication and entertainment equipment in a vehicle. More specifically, this invention relates to a container system that is uniquely mounted in the cab of a vehicle so that the liklihood of theft or vandalizing of the communication and entertainment equipment mounted within said container system is substantially reduced. Moreover, when the container system is properly mounted within the cab of the vehicle, the rigidity of the cab is substantially increased.

15 Claims, 8 Drawing Figures

CONTAINER SYSTEM FOR ENTERTAINMENT AND COMMUNICATIONS EQUIPMENT

BACKGROUND OF THE INVENTION

It has become common practice to incorporate entertainment equipment, such as AM and FM radios and stereophonic devices, in motor vehicles for the amusement of the occupants. More recently, the incorporation of communication equipment, such as citizen band radios and the like, in motor vehicles has increased dramatically.

However, this increased usage of entertainment and communication equipment in vehicles has also caused increased incidents of acts of crime in the theft and vandalism of this equipment. In fact, the number of thefts of entertainment and communication equipment has increased substantially in recent times.

Accordingly, it is an object of this invention to provide a container means to house the entertainment and communication equipment that will reduce the incidents of thefts from a vehicle.

DESCRIPTION OF THE INVENTION

Figure 1:
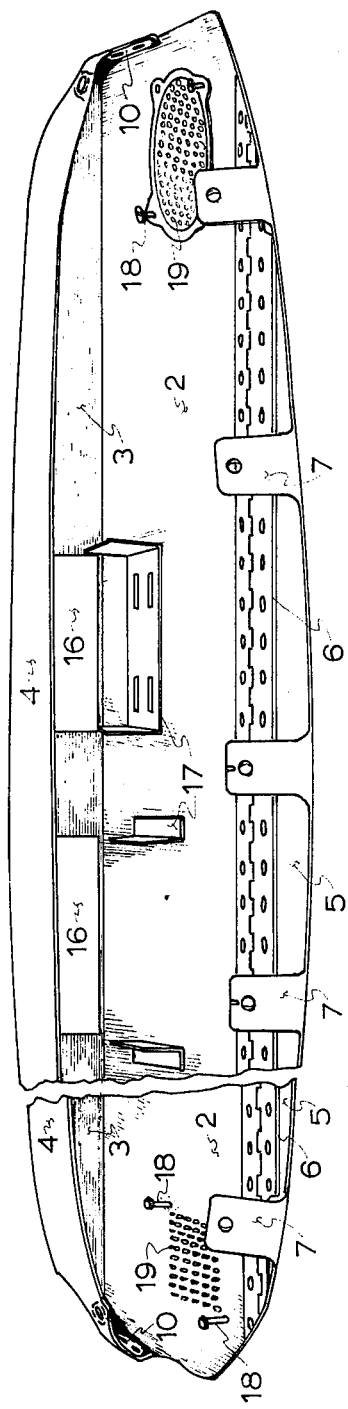
FIG. 1 is a view of the container means with one end broken away in indicated variable sizes.
Figure 2:
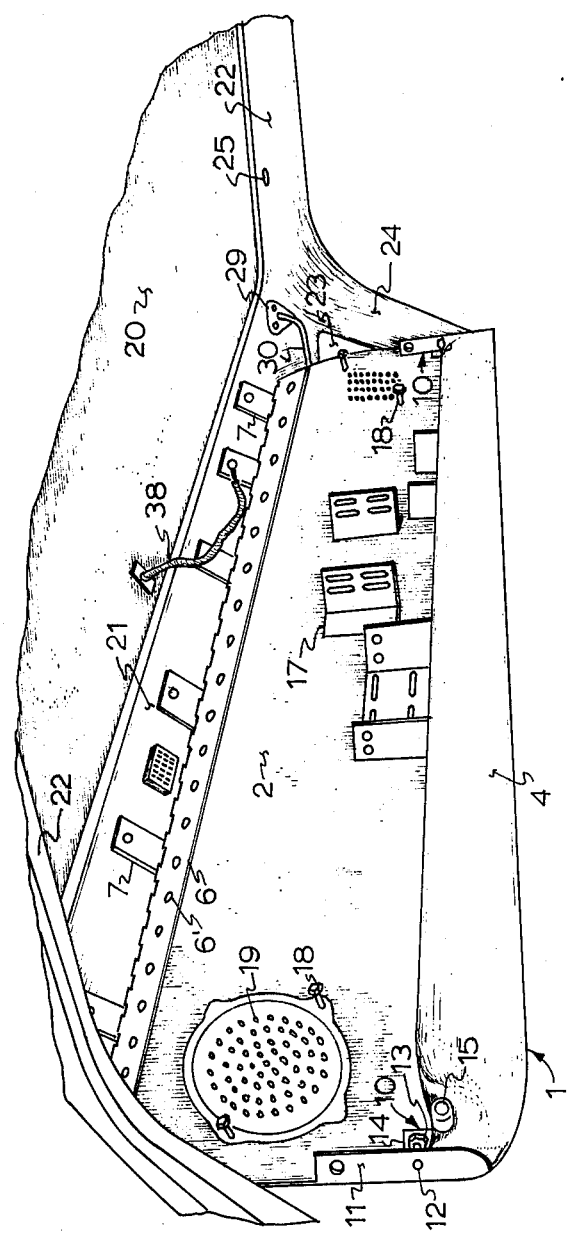
FIG. 2 is a perspective view of the container means mounted in a vehicle in an open position.
Figure 3:
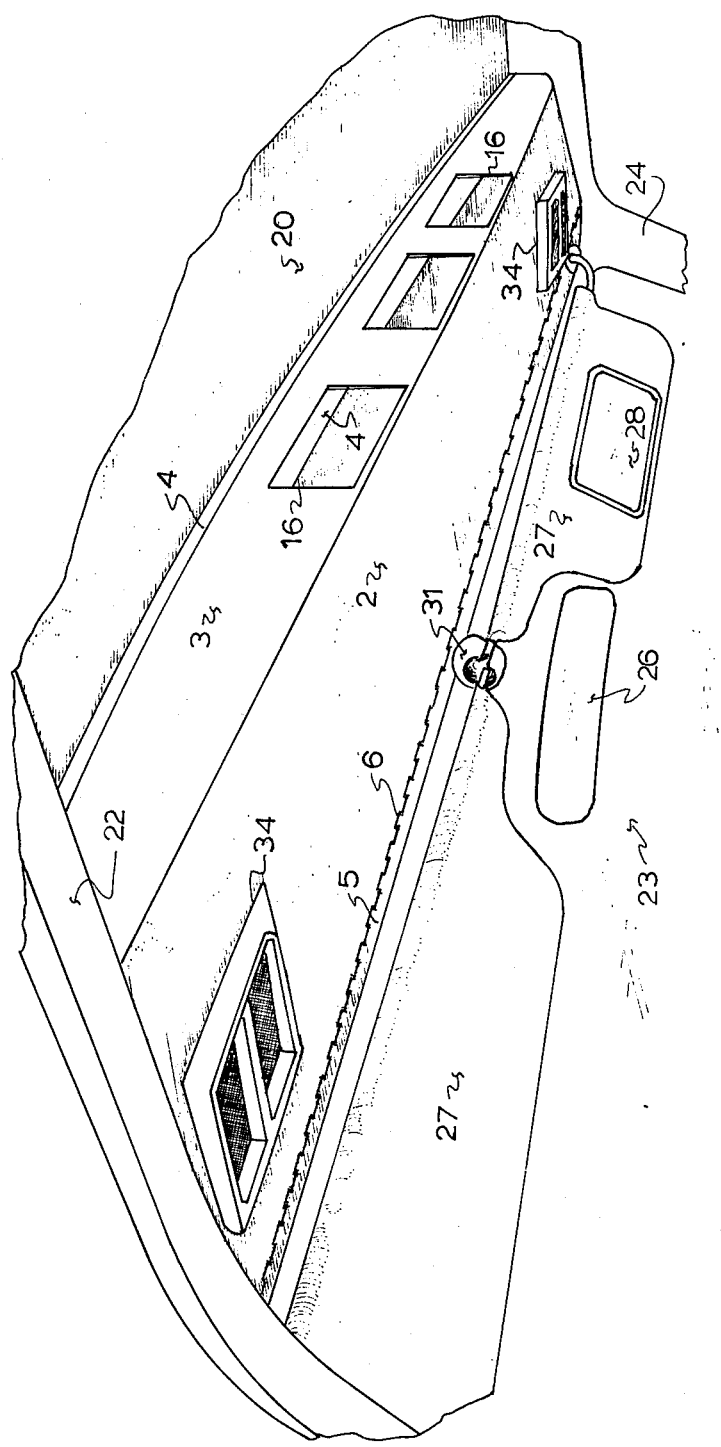
FIG. 3 is a perspective view similar to FIG. 2 with the container means in a closed position.
Figure 4:
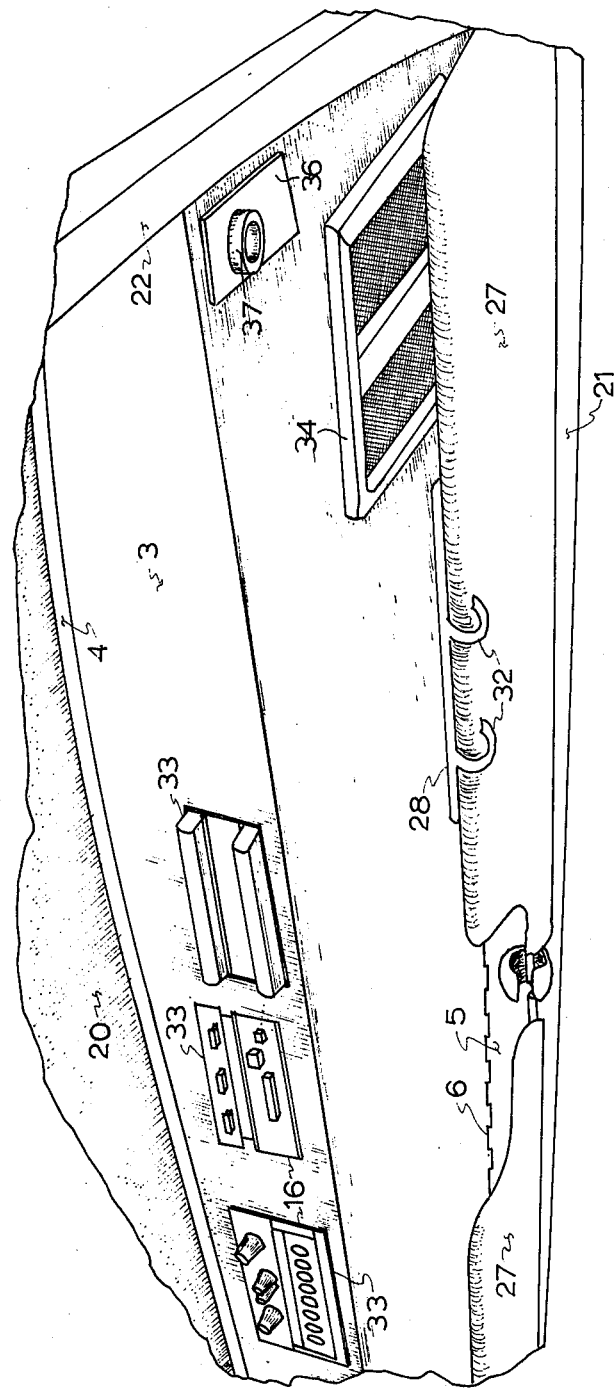
FIG. 4 is a partial perspective view of the container means locked in position with equipment in position.
Figure 5:
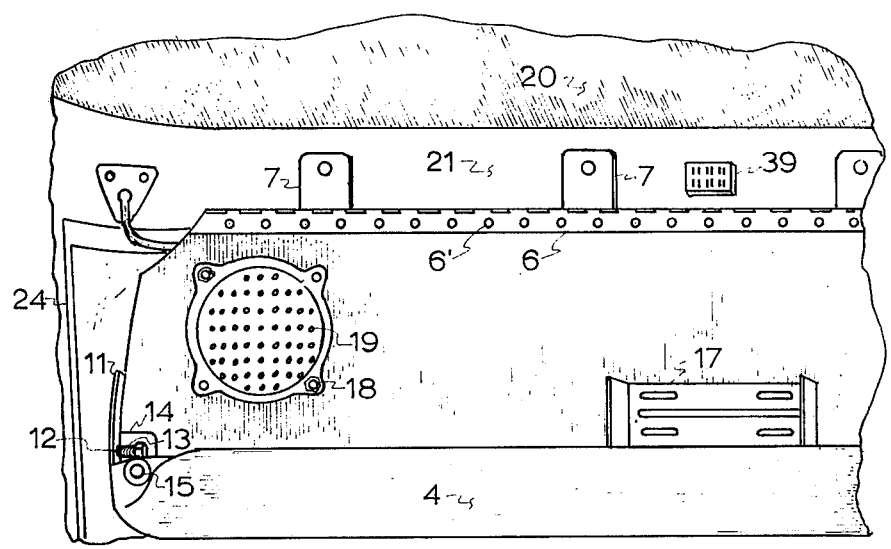
FIG. 5 is a partial view of the container means in an open position to show internal details.
Figure 8:
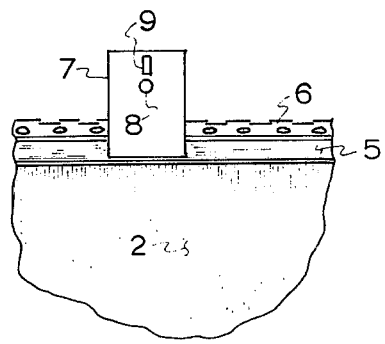
FIG. 8 is a view of the front mounting means illustrating the guide means.
Figure 7:
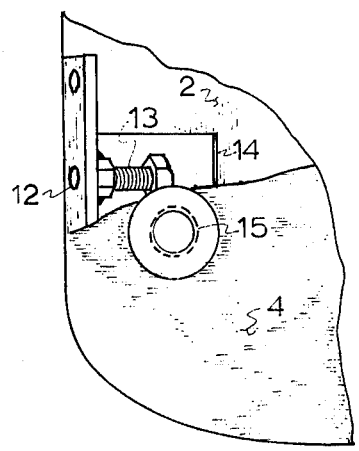
FIG. 7 is another veiw of the lateral mounting means.
Figure 6:
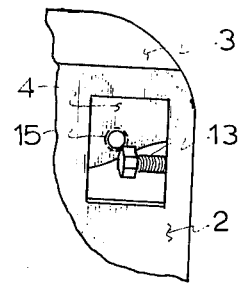
FIG. 6 is a veiw of the lateral mounting means.

Referring to the drawings, the container means 1 embodying the principals of this invention is adapted to be mounted within the cab of a motor vehicle. The container means 1 can be formed of any convenient material such as steel, aluminum, or alloys thereof or reinforced plastic. The only restriction is that it must be strong enough to withstand substantial external forces and will not crack or break therefrom and allow access to the interior thereof.

The container means 1 comprises a lower body means 2, a front body means 3 rigidly attached to the lower body means 2 and an upper body means 4 rigidly attached to the front body means 3. It should be noted that the body means 4 forms a "T" shape when rigidly attached to the body means 3 for a purpose to be hereinafter set forth. It is to be understood, however, that the body means 3 can be simply attached at one end to the body means 4.

The leading edge of the lower body means 2 is hingedly connected at 6 to a front mounting plate 5. The hinge 6 is rigidly connected to body means 2 and plate means 5 by welds 6'. It is to be understood that other connecting means, such as bolts or the like, can be employed. The front edge of the mounting plate means 5 is contoured to the vehicle that it is to be mounted in and is provided with spaced apart front mounting means 7. The front mounting means 7 extends upwardly and inwardly also to the contour of the vehicle in which it is to be mounted. The means 7 is also provided with an opening 8 to receive a threaded means, such as a bolt to mount the same to the front frame to the vehicle indicated at 21. Some of the mounting means 7 can be provided with guideposts 9 to facilitate ease in mounting of the same in the vehicle.

Adjacent the lateral edges of the upper body means 4 is provided a lateral mounting means 10. The lateral mounting means 10 comprises an angular plate 11 rigidly mounted to body means 2. The angle for plate 11 will be selected to correspond to the interior of lateral frame member 22. The plate 11 is provided with an opening 12 to receive threaded member 13 which is adapted to be rigidly connected to frame member 22 by threaded opening 15. Access to threaded member 13 is provided by opening 14 extending through the lower body means 2. Rigidly mounted adjacent opening 14 is a threaded mounting means 15. Opening 14 is provided with shoulder means 35 to receive a plate member 36 which is rigidly connected to a dead bolt 37. When the dead bolt 37 is screw threaded into threaded opening 15, plate member 36 is flush with the lower surface of body means 2.

The interior surface of lower body means 2 is provided with various brackets generally indicated at 17 to receive and mount entertainment and communications equipment generally indicated at 33. Power to equipment 33 is provided by cable 38 and connectors 39. The controls for this equipment will extend through opening 16 through the front body means 3. The size and shape of opening 16 in body means 3 can be selected to accommodate any number or shapes of equipment. Also, the body means 2 is provided with mounting studs 18 surrounding a plurality of openings 19 to mount speakers or the like. The exterior portion thereof is provided with speaker covers 34 rigidly mounted thereto.

The container means of this invention is mounted in the cab of a vehicle by providing threaded openings in the front top frame 21 in the cab thereof just above windshield 23. Bolts or the like will extend through openings 8 within mounting means 7 and rigidly connect mounting plate 5 thereto. The lateral edges of the lower body means 2 will be connected to the lateral frame 22 by bolt means 13 threadily connected to frame 22 by threaded opening 25.

As is apparent, the container means 1 is rigidly connected to the cab above sun visors 27 and, of course, rearview mirror 26. It may become necessary when installing container means 1 to move and/or adjust the visor mount 29 and arm 30 holding the visor in place, along with visor stabilizer 31. The visor 27 is provided with a mirror 28 mounted thereon at 32.

Thus, as can be seen from the above description and reference to the drawings, access to the interior can be achieved only by removing the dead bolt 37 and removing bolt 13 to allow body portion to pivot at hinge 6. Note that the body portion 4 coupled with the cab top 20 provides no room for removal of any equipment within the confines of container means 1. Also, when container means 1 is properly mounted, the body means 3 and 4 provide added strength to the upper cab and functions as a "roll bar" in the event of a rolling accident.

It should be pointed out that dead bolt 37 is commercially available and forms no part of the present invention except that dead bolt 37 requires a key to remove the same along with plate 36 rigidly attached thereto. This is the only access means to bolt means 13.

While this description has been provided with relationship to the drawings, it is understood that various modifications and design changes can be performed without departing from the spirit of this invention. For example and not by limitations, members 2, 3 and 4 and members 5 and 7 can be integral.

What is claimed is:

1. A container means for more secure mounting of entertainment and communication equipment in a vehicle comprising: a lower body means; a front body means connected to the rear portion of said lower body means; upper body means connected to said front body means; mounting plate means hingedly connected to the front portion of said lower body means; front mounting means connected to said mounting plate means and extending upwardly and inwardly; and lateral mounting means connected to the lateral portion of said lower body means; said lateral mounting means comprises an angular plate having an opening adapted to receive a threaded means and access through said threaded means is from inside said container means.

2. The container means as set forth in claim 1 wherein said front mounting means comprises spaced apart members each containing an opening.

3. The container means as set forth in claim 2 wherein some of said spaced apart members contain guideposts.

4. The container means as set forth in claim 1 wherein access to said threaded means is through an opening in said lower body means which opening is closed by a plate means rigidly connected to a dead bolt means.

5. The container means as set forth in claim 1 wherein said front mounting means comprises spaced apart members each containing an opening and some of said spaced apart members contain guideposts, and said lateral mounting means comprises an angular plate having an opening adapted to receive a threaded means and acces to said threaded means is from inside said container means and access to said threaded means is through an opening in said lower body means which opening is closed by a plate means rigidly connected to a dead bolt means.

6. The container means as set forth in claim 1 together with means on the interior thereof for mounting entertainment and communication equipment.

7. The container means as set forth in claim 6 wherein access to the controls of said equipment is through opening in said front body means.

8. A system for more secure mounting of entertainment and communication equipment in a vehicle comprising: a container means mounted on the front frame above the windshield and between the lateral frame of the cab of said vehicle, said container means comprises: a lower body means; a front body means connected to the rear portion of said lower body means; upper body means connected to said front body means; mounting plate means hingedly connected to the front portion of said lower body means; front mounting means connected to said mounting plate means and extending upwardly and inwardly; and lateral mounting means connected to the lateral portion of said lower body means; said lateral mounting means comprising an angular plate having an opening adapted to receive a threaded means and access to said threaded means is from inside said container means.

9. The system as set forth in claim 8 wherein said front mounting means comprises spaced apart members each containing an opening.

10. The system as set forth in claim 9 wherein some of said spaced apart members contain guideposts.

11. The system as set forth in claim 8 wherein access to said threaded means is through an opening in said lower body means which opening is closed by a plate means rigidly connected to a dead bolt means.

12. The system as set forth in claim 8 wherein said front mounting means comprises spaced apart members each containing an opening and some of said spaced apart members contain guideposts, and said lateral mounting means comprises an angular plate having an opening adapted to receive a threaded means and access to said threaded means is from inside said container means and access to said threaded means is through an opening in said lower body means which opening is closed by a plate means rigidly connected to a dead bolt means.

13. The system as set forth in claim 8 together with means on the interior thereof for mounting entertainment and communication equipment.

14. The system as set forth in claim 13 wherein access to the controls of said equipment is through openings in said front body means.

15. The system as set forth in claim 8 wherein the front body means and upper body means together form a reinforcing means for the upper portion of the cab.

* * * * *

UNITED STATES PATENT AND TRADEMARK OFFICE
CERTIFICATE OF CORRECTION

PATENT NO. : 4,079,987
DATED : March 21, 1978
INVENTOR(S) : Daniel T. Bumgardner It is certified that error appears in the above-identified patent and that said Letters Patent are hereby corrected as shown below:

Title page should be changed as follows:

Immediately following United States Patent [19], "Bumgardener" should read Bumgardner.

[76] Inventor should read:

Daniel T. Bumgardner, 4740 Appian Way, El Sobrante, Calif. 94803

Signed and Sealed this

Fifteenth Day of August 1978

[SEAL]

Attest:

RUTH C. MASON
Attesting Officer

DONALD W. BANNER
Commissioner of Patents and Trademarks